United States Patent
Lee

(10) Patent No.: US 10,638,543 B2
(45) Date of Patent: Apr. 28, 2020

(54) PHOTONIC HEATER

(71) Applicant: Taiwan Semiconductor Manufacturing Company, Ltd., Hsinchu (TW)

(72) Inventor: Hui Yu Lee, Hsin-Chu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 309 days.

(21) Appl. No.: 15/691,909

(22) Filed: Aug. 31, 2017

(65) Prior Publication Data
US 2019/0069347 A1   Feb. 28, 2019

(51) Int. Cl.
*H05B 1/02* (2006.01)
*G02F 1/29* (2006.01)
*G02F 1/313* (2006.01)
*G02F 1/01* (2006.01)

(52) U.S. Cl.
CPC ......... *H05B 1/0288* (2013.01); *G02F 1/0147* (2013.01); *G02F 1/29* (2013.01); *G02F 1/313* (2013.01); *H05B 1/0227* (2013.01); *G02F 2201/58* (2013.01)

(58) Field of Classification Search
CPC ........ H05B 1/02; H05B 1/0288; H05B 3/009; G02F 1/29

USPC ............ 219/492, 494, 497, 507, 508, 501
See application file for complete search history.

(56) References Cited

U.S. PATENT DOCUMENTS

| | | | | |
|---|---|---|---|---|
| 3,546,437 A * | 12/1970 | Steghart | .................. | C08F 10/00 219/511 |
| 3,858,027 A * | 12/1974 | Phillips | .................... | H05B 3/84 219/203 |
| 3,881,085 A * | 4/1975 | Traister | .............. | G03G 15/2003 219/216 |
| 8,402,884 B2 * | 3/2013 | Choi | .................... | A47J 37/0842 99/332 |
| 9,006,618 B2 * | 4/2015 | Lamesch | ................ | B60N 2/002 219/202 |
| 10,136,478 B2 * | 11/2018 | Anton Falcon | ........ | H05B 6/062 |
| 2008/0308548 A1 * | 12/2008 | Fish | .................... | G05D 23/1934 219/494 |

* cited by examiner

*Primary Examiner* — Mark H Paschall
(74) *Attorney, Agent, or Firm* — Merchant & Gould P.C.

(57) ABSTRACT

A photonic heater is provided. The photonic heater includes a current source and a transfer circuit. The transfer circuit connected to the current source. The photonic heater further includes a heating element. The heating element is connected to the transfer circuit. The transfer circuit is operable to regulate an amount of current being transferred from the current court to the heating element.

20 Claims, 18 Drawing Sheets

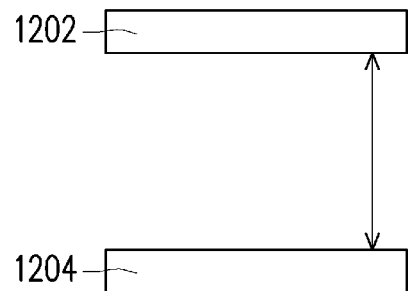
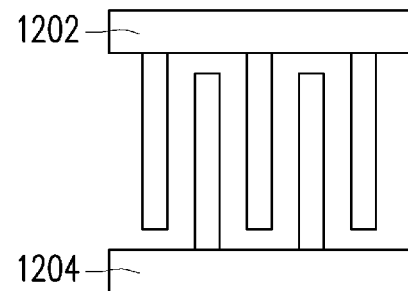
FIG. 12A        FIG. 12B
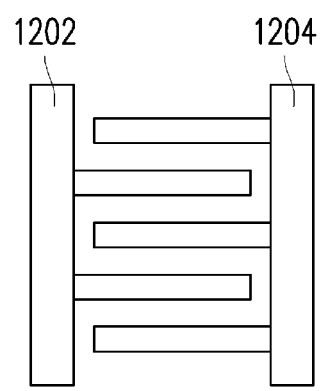
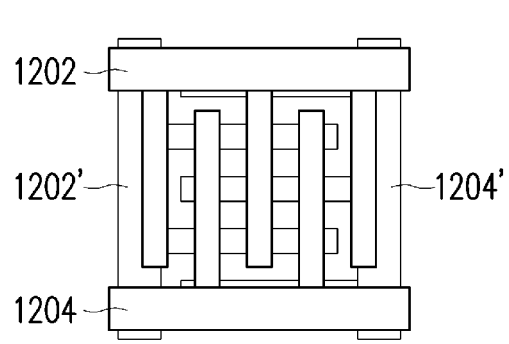
FIG. 12C        FIG. 12D

| Rule | Description | Unit (m) |
|---|---|---|
| A | Distance of photonic device (inside SOI) to thermal heater | 0.1u < A < 1.5u |
| B | Min. thermal heater width (in horizontal) | 1.0u < B |
| C | Min. thermal heater length (in vertical) | 1.0u < C |
| D | Min. space between thermal heater (in horizontal) | 2.5u < D |
| E | Min. space between thermal heater (in vertical) | 2.5u < E |
| F | Min. area of thermal heater | 1.0um² < F |

FIG. 14C

| Rule | Description | Unit (m) |
|---|---|---|
| G | Min. enclosure of thermal heater | 0.5u < G |
| H | Thermal heater intersects photonic device | Not allowed |
| I | Two photonic devices share same thermal heater and intersect | Not allowed |

FIG. 15D

PHOTONIC HEATER

BACKGROUND

Advances in silicon and silicon compatible photonics have stimulated high density integration of photonic and electronic components. An example is the manufacturing of silicon photonics on the same platform as a complementary metal oxide semiconductor (CMOS). Part of the allure of silicon photonics is its size advantages. For example, photonic circuits on silicon can be very small. As such, photonic circuits are poised to address the ever-growing high-bandwidth needs of servers and data centers of tomorrow, where the high-volume processing of silicon platforms and the low cost of traditional optical communications may redefine the constraints of high-performance interconnects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 12A illustrates an example side view of a charge storage device of a photonic heater in accordance with some embodiments.

FIG. 12B illustrate an example top view of a charge storage device of a photonic heater in accordance with some embodiments.

FIG. 12C illustrates another example top view of a charge storage device of a photonic heater in accordance with some embodiments.

FIG. 12D illustrates yet another example top view of a charge storage device of a photonic heater in accordance with some embodiments.

FIG. 14C illustrates a first table listing example design dimensional features for a photonic heater in accordance with some embodiments.

FIG. 15D illustrates a second table listing design dimensional features for a photonic heater in accordance with some embodiments.

DETAILED DESCRIPTION

Figure 1:
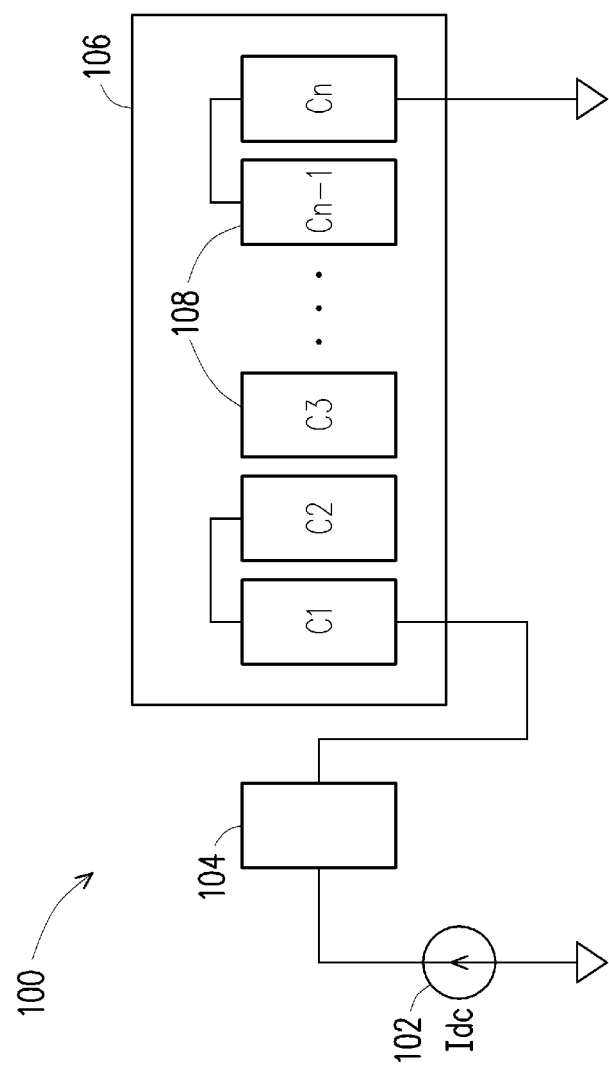
FIG. 1 illustrates an example photonic heater in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The disclosure in various embodiments provides a photonic heater. Silicon has a high thermo-electric coefficient which makes it extremely sensitive to temperature variations. This high thermal sensitivity is exploited. For example, thermo-optical tuning of the refractive index is one of the operations performed in integrated silicon photonic circuits for thermal stabilization, compensation of fabrication tolerances, and implementation of photonic operations. The thermo-optical tuning for the photonic circuits is achieved by providing localized heating. In example embodiments, the disclosure provides a photonic heater for localized heating of photonic circuits. For example, the photonic heater disclosed herein is operable to change a phase and a wave length of a photonic component (i.e., a waveguide or a ring coupler) through localized heating to control its circuit performance.

Figure 1A:
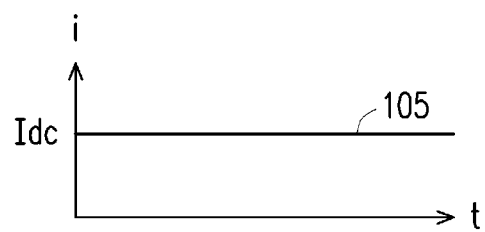
FIG. 1A illustrates a plot of an output current of a current source of a photonic heater in accordance with some embodiments.

FIG. 1 provides an example illustration of photonic heater 100 according to embodiments of the disclosure. As illustrated in FIG. 1, photonic heater 100 includes a current source Idc 102, a transfer circuit 104, and a heating element 106. In example embodiments, current source Idc 102 is a time invariant current source, such as, a direct current (DC) source, and is operable to provide a current Idc to transfer circuit 104. FIG. 1A illustrates an example plot of the current Idc on a time scale. As shown in the example plot of FIG. 1A, the current Idc is a time invariant (i.e. a constant) current.

Current source Idc 102 is connected to a first end of transfer circuit 104. Transfer circuit 104 is operable to convert the current Idc into a time variant current. The time variant current is then fed to heating element 106. For example, and as shown in FIG. 1, a second end of transfer circuit 104 is connected to a first end of heating element 106. A second end of heating element 106 is connected to ground.

Heating element 106 includes one or more conductors (i.e., $C_1, C_2, C_3, \ldots, C_{n-1}$, and $C_n$) 108. In example embodiments, conductors 108 are metallic conductors with inherent resistance characteristics. Because of such inherent resistance characteristics, conductors 108 produce heat when a current is provided. Although conductors 108 of heating element 106 are illustrated to be arranged in parallel in FIG. 1, after reading this disclosure one skilled in the art will appreciate that other configurations are possible. For example, conductors 108 can be arranged in multiple layers crisscrossing each other. In addition, although conductors 108 of heating element 106 are illustrated to be rectangular in shape, after reading this disclosure one skilled in the art will appreciate that other configurations are possible. For example, conductors 108 can be circular.

Figure 2:
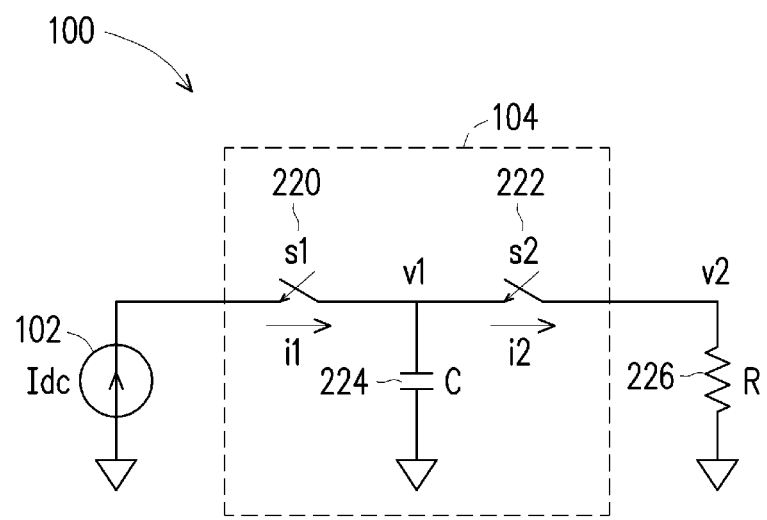
FIG. 2 illustrates a circuit diagram of a photonic heater in accordance with some embodiments.

FIG. 2 illustrates a simplified circuit diagram of photonic heater 100. As shown in FIG. 2, the simplified circuit diagram of photonic heater 100 includes current source Idc 102 connected to a first end of transfer circuit 104. Heating element 106 is represented as a resistor R 226 in the simplified circuit diagram. A second end of transfer circuit 104 is connected to a first end of resistor 226. A second end of resistor 226 is connected to the ground. A resistance value of resistor R 226 depends on a type of metal used for conductors 108.

As illustrated in FIG. 2, transfer circuit 104 includes a first switch S1 220, a second switch S2 222, and a charge storage device C 224. First switch S1 220 and second switch S2 222 are switches with an ON state and an OFF state. In the ON state a current can pass through the switches, while in the OFF state approximately no current passes through them. In example embodiments, first switch S1 220 and second switch S2 224 are a N-type metal oxide semiconductor field effect transistor (MOSFET) switch, a P-type MOSFET switch, or a transmission gate switch. This list of types of switches is not exhaustive, and after reading this disclosure one skilled in the art will appreciate that other types of switches can be used in transfer circuit 104.

As illustrated in FIG. 2, an output of current source Idc 102 is connected to a first end of first switch S1 220. A second end of first switch S1 220 is connected to a first end of second switch S2 222. A second end of second switch S2 222 is connected to a first end of resistor R 226. A first end of charge storage device C 224 is connected to a common node of both the second end of first switch S1 220 and a first end of second switch S2 222. A second end of charge storage device C 224 is connected to the ground.

In example embodiments, transfer circuit 104 is operable to convert the time invariant current Idc of current source Idc 102 into a time variant current (i.e., a second current i2). The converted second current i2 is then injected into resistor R 226. In example embodiments, an amount of second current i2 injected into resistor R 226 is controlled by controlling a switching pattern of one or both of first switch S1 220 and second switch S2 222.

For example, transfer circuit 104 is operable to convert the time invariant current Idc into time variant second current i2 by operating first switch S1 220 and second switch S2 222 into an interleaf ON-OFF sequence. In example embodiments, in the interleaf ON-OFF sequence, both first switch S1 220 and second switch S2 222 are not in the switch ON state at the same time. However, in the interleaf ON-OFF sequence both first switch S1 220 and second switch S2 222 can be in the switch OFF state at the same time.

Figure 3A:
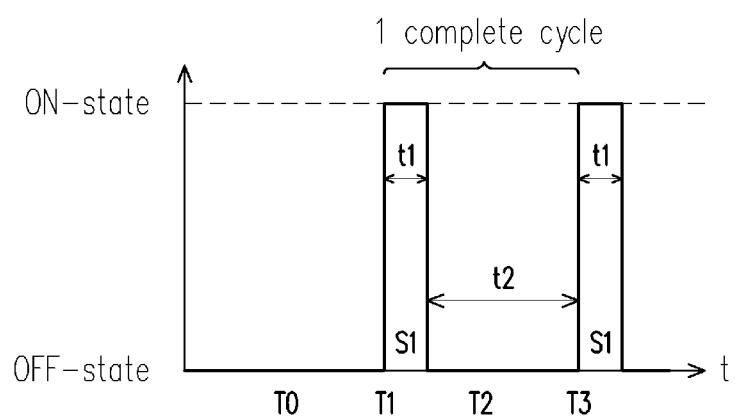
FIG. 3A illustrates an example switching pattern for a first switch of a transfer circuit in accordance with some embodiments.
Figure 3B:
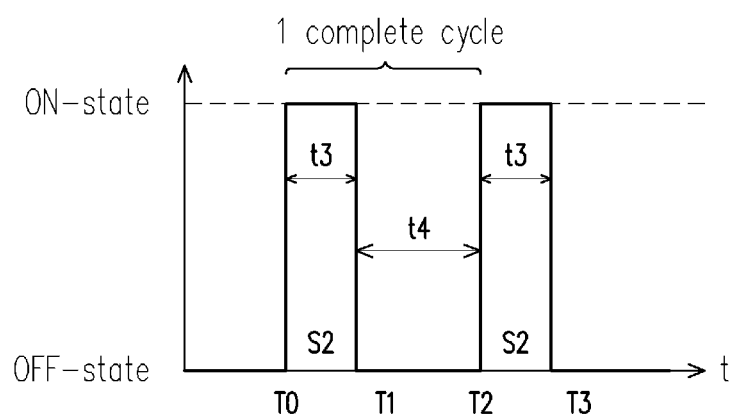
FIG. 3B illustrates an example switching pattern for a second switch of the transfer circuit in accordance with some embodiments.
Figure 3C:
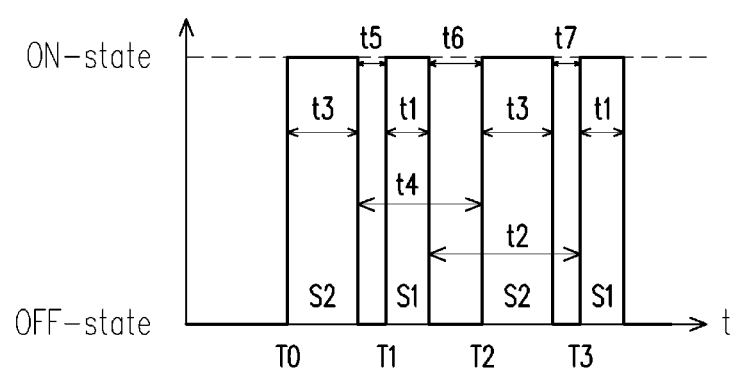
FIG. 3C illustrates a combined switching pattern for both switches of the transfer circuit in accordance with some embodiments.

FIGS. 3A, 3B, and 3C illustrate an example of the interleaf ON-OFF sequence for first switch S1 220 and second switch S2 222. For example, FIG. 3A illustrates an example switching pattern for first switch S1 220. As shown in FIG. 3A, first switch S1 220 is switched ON at a time T1. After being switched on at the time T1, first switch S1 220 remains in the switch ON state for a first time period t1. After the end of the first time period t1, first switch S1 220 is switched OFF and remains in the switch OFF state for a second time period t2. In example embodiments, and as shown in FIG. 3A, the end of the second time period t2 marks completion of one switching cycle for first switch S1 220. First switch S1 220 is again switched ON at a time T3 to start a second switching cycle. As shown in FIG. 3A, after being switched ON at the time T3, first switch S1 220 remains in the switch ON state again for the first time period t1, and so forth.

FIG. 3B illustrates an example switching pattern for second switch S2 222. As shown in FIG. 3B, second switch S2 222 is switched ON at a time T0. After being switched ON at the time T0, second switch S2 222 remains in the switch ON state for a third time period t3. After the end of the third time period t3, second switch S2 222 is switched OFF and remains in the switch OFF state for a fourth time period t4. In example embodiments, and as shown in FIG. 3B, the end of the fourth time period t4 marks the completion of one switching cycle for second switch S2 222. Second switch S2 222 is again switched ON at a time T2 to start a second switching cycle. As shown in FIG. 3B, after being switched ON at the time T2 for the second switching cycle, second switch S2 222 remains in the switch ON state again for the third time period t3, and so forth.

FIG. 3C illustrates a combined switching pattern for first switch S1 220 and second switch S2 222 in the interleaf ON-OFF sequence. For example, and as shown in FIG. 3C, second switch S2 222 is switched ON at the time T0 and remains in the switch ON state for a third time period t3. Second switched S2 222 is then switched OFF at the end of the third time period t3. After the switching OFF of second switch S2 222, neither first switch S1 220 nor second switch S2 222 are in the switch ON state for a fifth time period t5. That is, during the fifth time period t5 both first switch S1 220 and second switch S2 222 are in the switch OFF state.

Then at the time T1, first switch S1 220 is switched ON. First switch S1 220 remains in the switch ON state for the first time period t1. At the end of the first time period t1, first switch S1 220 is switched OFF. As shown in FIG. 3C, after the switching OFF of first switch S1 220 at the end of the first time period t1, both first switch S1 220 and second switch S2 222 are in the switch OFF state for a sixth time period t6. In addition, and as shown in FIG. 3C, second switch S2 222 remains in the switch OFF state for a fourth time period t4.

At the end of the fourth time period t4, second switch S2 222 is switched ON again at the time T2 for the third time period t3 to initiate at a second switching cycle for second switch S2 222. Similarly, and as shown in FIG. 3C, first switch S1 220 remains switched OFF for the second time period t2. After the switching OFF of second switch S2 222, both first switch S1 220 and second switch S2 222 remain in the switch OFF state for a seventh time period t7. At the end of the seventh time period t7 which also coincides with the end of the second time period t2, first switch S1 220 is switched ON again at time T3 for the first time period t1 to initiate at the second switching cycle for first switch S1 220.

In example embodiments, and as shown in the combined switching pattern of FIG. 3C, in the interleaf mode of operation, both first switch S1 220 and second switch S2 222 are not in the switch ON state at the same time. For example, at any given time in the switching pattern at least one or both of first switch S1 220 and second switch S2 222 is in the switch OFF state.

In example embodiments, when first switch S1 220 is switched ON, current source Idc 102 is connected to charge storage device C 224 via first switch S1 220. A first current i1 flows through first switch S1 220 thereby charging charge storage device C 224. The first current i1 builds up the charge in charge storage device C 224. Once first switch S1 220 is switched OFF, current source Idc 102 is disconnected from charge storage device 224 and no current flows through first switch S1 220.

In example embodiments, when second switch S2 222 is switched ON, charge storage device C 224 is connected to resistor R 226 via second switch S2 222. Thus, the charge built across charge storage device C 224 is dissipated through resistor R 226 causing a second current i2 across second switch S2 222. The second current i2 ceases either when second switch S2 222 is switched OFF or when charge storage device C 224 is completely discharged.

In example embodiments, transfer circuit 104 is operable to control the amount of time variant current (i.e. the second current i2) being injected into heating element 106 by controlling a duty cycle of first switch S1 220 and/or second switch S2 222. For example, by controlling the duty cycle of first switch S1 220 and/or second switch S2 222, the amount of the second current i2 is controlled.

In example embodiments, the duty cycle is determined in terms of a switch ON time and a switch OFF time. For example, first switch S1 220 is in the switched ON state for a first time period t1 and is in switched OFF state for a second time period t2. A cycle time for first switch S1 220 is determined as (t1+t2). The duty cycle for first switch S1 220 is determined as the switch ON time over the cycle time (i.e., t1/(t1+t2)). Similarly, the duty cycle for second switch S2 222 is determined as t3/(t3+t4).

Figure 4A:
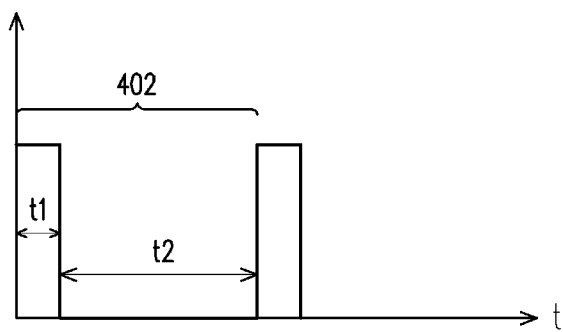
FIG. 4A illustrates a first example of a duty cycle of a switch of the transfer circuit in accordance with some embodiments.
Figure 4B:
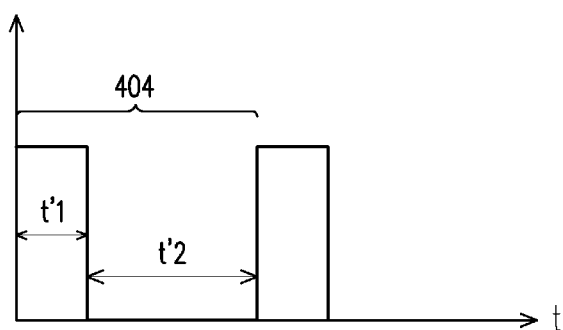
FIG. 4B illustrates a second example of the duty cycle of a switch of the transfer circuit in accordance with some embodiments.

FIGS. 4A and 4B illustrates two example duty cycles for first switch S1 220. For example, FIG. 4A illustrates a first example duty cycle 402 for a switch ON time of the first time period t1 and a switch OFF time of the second time period t2. FIG. 4B illustrates a second example duty cycle 404 for a switch ON time of t'1 and a switch OFF time of t'2. The switch ON time t'1 in FIG. 4B is greater than the switch ON time t1 of FIG. 4A.

As shown in FIGS. 4A and 4B, because t'1/t'2 is more than t1/t2, second example duty cycle 404 is more than first example duty cycle 402. Thus, in accordance with example embodiments, the duty cycle for first switch S1 220 is controlled by controlling the switch ON time t1 of first switch S1 220. For example, the duty cycle for first switch S1 220 can be increased or decreased by increasing or decreasing the first switch ON time (i.e., the first time period t1) for first switch S1 220. Similarly, in accordance with example embodiments, the duty cycle for second switch S2 222 can be increased or decreased by increasing or decreasing the switch ON time (i.e., the third time period t3) for second switch S2 222. In example embodiments, the duty cycles of first switch S1 220 and second switch S2 222 determines an amount of the second current i2 being injected into heating element 106.

Figure 5:
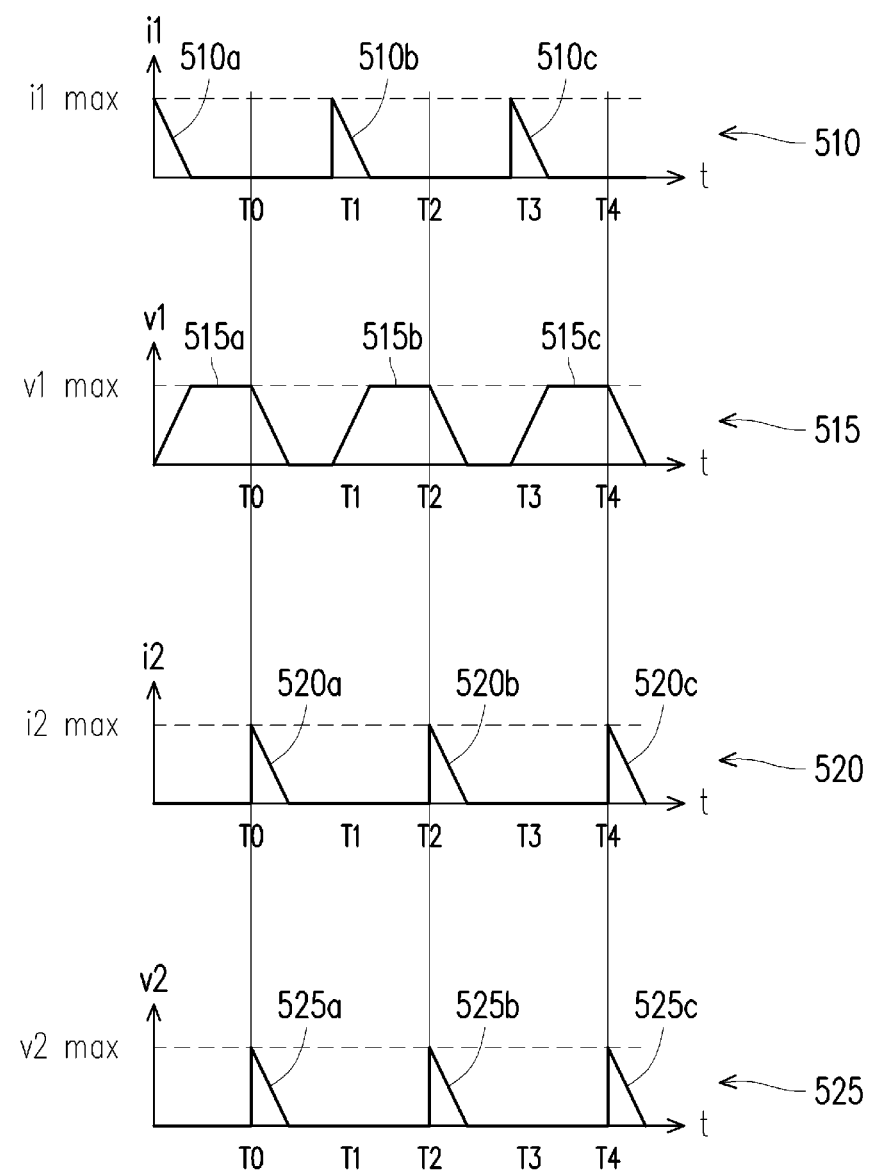
FIG. 5 illustrates plots of voltages and currents through the switches of the transfer circuit in accordance with some embodiments.

FIG. 5 plots of current and voltages at different points of transfer circuit 104 for the example combined switching pattern of FIG. 3C. For example, a second plot 510 of FIG. 5 illustrates an amount of the first current i1 through first switch S1 220. As discussed previously, the first current i1 is induced through first switch S1 220 when first switch S1 220 is switched ON. Since, first switch S1 220 and second switch S2 222 are not switched ON at the same time, second switch S2 222 will be in the switch OFF state while first switch S1 220 is in the switch ON state.

In example embodiments, when first switch S1 220 is in the switch ON state, the first current i1 flows through first switch S1 220 and charge storage device C 224 to the ground. As illustrated in sub-plot 510b of second plot 510, the first current i1 is at the maximum value (i.e., i1max) when first switch S1 220 is switched ON at the time T1 and tapers down as charge storage device C 224 begins accumulating charge. The first current i1 drops to the minimum value (i.e. approximately equal to zero) either when first switch S1 220 is switched OFF after the first time period t1 or when charge storage device C 224 is fully charged. As shown by sub-plot 510c, the first current i1 follows a similar pattern when first switch S1 220 is switched on again at the time T3. Similarly, and as shown by sub-plot 510a, the first current i1 follows a similar pattern when first switch S1 220 is switched on at a time prior to the time T0.

In addition, and as shown in sub-plot 515b of a second plot 515 of FIG. 5, a first voltage v1 across charge storage device C 224 starts building up when first switch S1 220 is switched ON at the time T1. The first voltage v1 is at the minimum value (i.e., approximately close to zero) at the time T1 when first switch S1 220 is switched ON. In addition, and shown in sub-plot 515b, the maximum value (i.e., v1max) of the first voltage v1 across charge storage device C 224 coincides with the first current i1 dropping to its minimum. When first switch S1 is also switched OFF after the first time period t1, the first voltage v1 across charge storage device C 224 has no path to dissipate. Hence, and as shown in sub-plot 515b, the first voltage v1 across charge storage device C 224 remains at the maximum level until second switch S2 222 is switched ON at the time T2. The first voltage v1 starts dropping when second switch S2 222 is switched ON at the time T2. For example, upon the switching ON of second switch S2 222, the charge accumulated in charge storage device C 224 starts dissipating though heating element 106. As shown by sub-plots 515a and 515b, the first voltage v1 follows a similar pattern during other switching cycles of first switch S1 220 and second switch S2 222.

A third plot 520 illustrates a second current i2 which flows through second switch S2 222. The second current i2 flows through second switch S2 222 when second switch S2 222 is switched ON. For example, when second switch S2 222 is switched ON, charge storage device C 224 is connected to heating element 106. As a result, the charge accumulated in charge storage device C 224 drains through heating element 106 causing a flow of the second current i2. The second current i2 is approximately proportional to a rate of discharge of the first voltage v1 across charge storage device C 224. For example, and as shown in sub-plot 520a, the second current i2 is at the maximum value (i.e., i2max) when second switch S2 222 is switched ON at time T0 and drops to the minimum value (i.e., approximately close to zero) either when second switch S2 222 is switched OFF or when charge storage device C 224 is completely discharged. In addition, as shown by sub-plots 520b and 520c, the second current i2 follows a similar pattern when second switch S2 222 is switched ON at time T2 and time T4.

A fourth plot 525 illustrates a second voltage v2 at a first end of heating element 106. As shown in sub-plot 525a, the second voltage v2 is at the maximum value (i.e., v2max) when second switch S2 222 is switched on at the time T0. The second voltage v2 decreases as the charge accumulated in charge storage device C 224 is dissipated through heating element 106, and reaches to the minimum value (i.e., approximately close to zero) either when charge storage device C 224 is completely discharged or when second switch S2 222 is switched OFF. In addition, as shown by sub-plots 525b and 525c, the second voltage v2 follows a similar pattern when second switch S2 222 is switched OFF at the time T2 and the time T4.

Figure 6A:
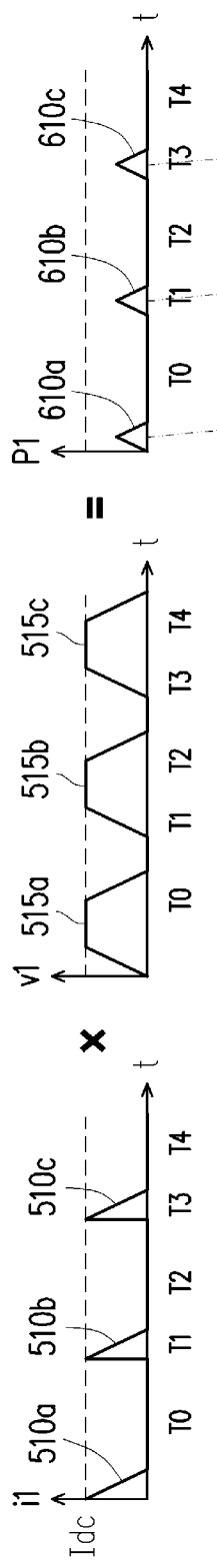
FIG. 6A illustrates an example of a power consumption calculation of a photonic heater when a first switch is switched ON in accordance with some embodiments.

In example embodiments, the power consumption of photonic heater 100 is calculated as a sum of products of voltages applied across photonic heater 100 and currents induced in photonic heater 100 by the applied voltages. FIG. 6A illustrates power consumption for photonic heater 100 when first switch S1 220 is switched ON. The power consumption for photonic heater 100 when first switch S1 220 is switched ON is because of building of the charge across charge storage device C 224. The power consumption of photonic heater 100 when first switch S1 220 is product of the first current i1 and the first voltage v1. For example, the power consumption of photonic heater 100, when first switch S1 220 is switched ON is provided as:

$$P_1 = \int_0^{T_N} [v1(t) \times i1(t)] dt \quad (1)$$

Sub-plot 610a of FIG. 6A illustrates a product of sub-plot 510a of first current i1 and sub-plot 515a of the first voltage v1. Similarly, sub-plot 610b illustrates a product of sub-plot 510b of the first current i1 and sub-plot 515b of the first voltage v1. In addition, sub-plot 610c illustrates a product of sub-plot 510c of the first current it and sub-plot 515c of the first voltage v1. The total power consumption of photonic heater 100 when first switch S1 220 is switched ON is the sum of areas covered by sub-plots 610a, 610b, and 610c.

Figure 6B:
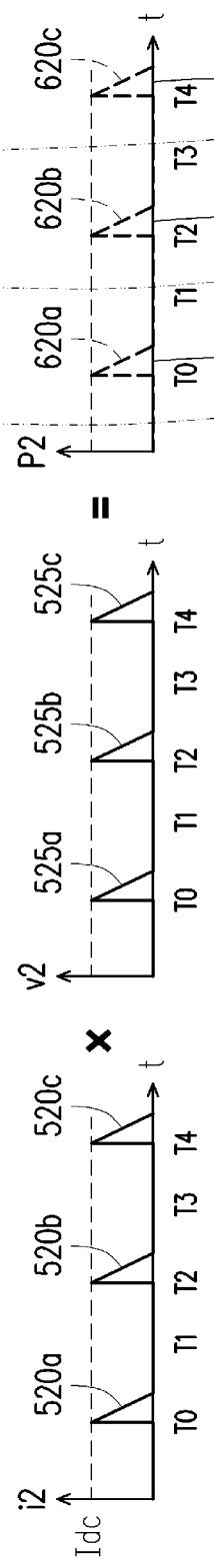
FIG. 6B illustrates an example of a power consumption calculation of a photonic heater when a second switch is switched ON in accordance with some embodiments.

FIG. 6B illustrates power consumption of photonic heater 100 when second switch S2 222 is switched ON. Power is dissipated by heating element 106 when second switch S2 222 is switched ON. In example embodiments, the power consumption of photonic heater 100 when second switch S2 222 is product of the second current i2 and the second voltage v2. For example, the power consumption of photonic heater 100 when second switch S2 222 is switched ON is provided as:

$$P_2 = \int_0^{T_N} [v2(t) \times i2(t)] dt \quad (2)$$

A sub-plot 620a of FIG. 6B illustrates a product of the sub-plot 520a of the second current i2 and the sub-plot 525a of the second voltage v2. Similarly, a sub-plot 620b of FIG. 6B illustrates product of the sub-plot 520b of the second current i2 and the sub-plot 525b of the second voltage v2. In addition, a sub-plot 620c of FIG. 6B illustrates a product of sub-plot 520c of the second current i2 and sub-plot 525c of the second voltage v2. The total power consumption of photonic heater 100 when second switch S2 222 is switched ON is the sum of areas covered by sub-plots 620a, 620b, and 620c.

Figure 6C:
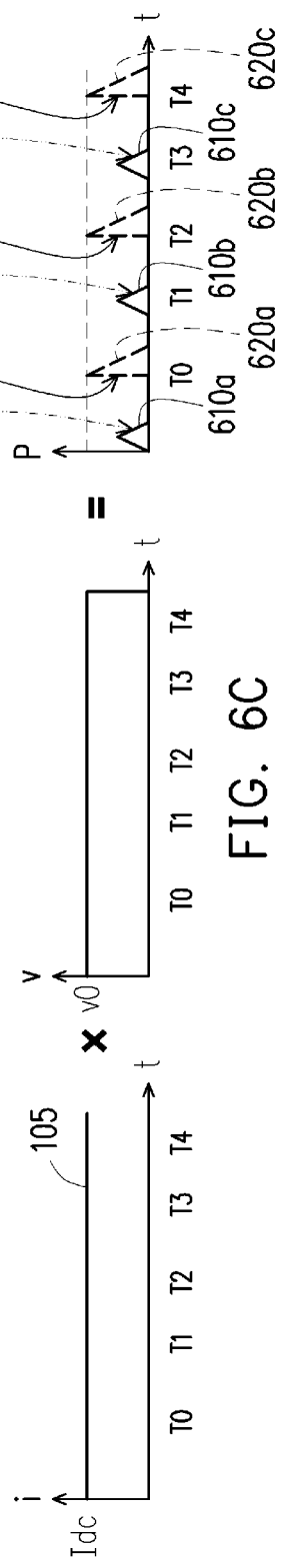
FIG. 6C illustrates an example of a total power consumption of a photonic heater in accordance with some embodiments.

FIG. 6C illustrates the total power consumption for photonic heater 100. In example embodiments, since no current flows though photonic heater 100 when both first switch S1 220 and second switch S2 222 are switched OFF, the consumption of power during this period is presumed to be negligible. Hence, the total power consumption of photonic heater 100 is determined by aggregating the power consumption provided by equation (1) and equation (2). That is, the total power consumption of photonic heater 100 is provided as:

$$P = P_1 + P_2 \quad (3)$$

$$= \int_0^{T_N} [v1(t) \times i1(t)] dt + \int_0^{T_N} [v2(t) \times i2(t)] dt \quad (4)$$

For example, and as shown in FIG. 6C, the total power consumption of photonic heater 100 is represented by sum of areas of plots 610a, 610b, 610c, 620a, 620b, and 620c.

In example embodiments, and as provided by equation (4), the total power consumption of photonic heater 100 is controlled by controlling the duty cycle, that is, the switching pattern of first switch S1 220 and/or second switch S2 222. In addition, the heat produced by heating element 106 is controlled by controlling the duty cycle of first switch S1 220 and/or second switch S2 222. Moreover, the temperature change of heating element 106 is regulated by controlling the duty cycle of first switch S1 220 and/or second switch S2 222. For example, the amount of heat produced by heating element 106 is controlled by controlling the amount of second current i2 being injected into heating element 106 which in turn is controlled by the switch ON time (i.e. the third time period t3) of second switch S2 222.

Figure 7:
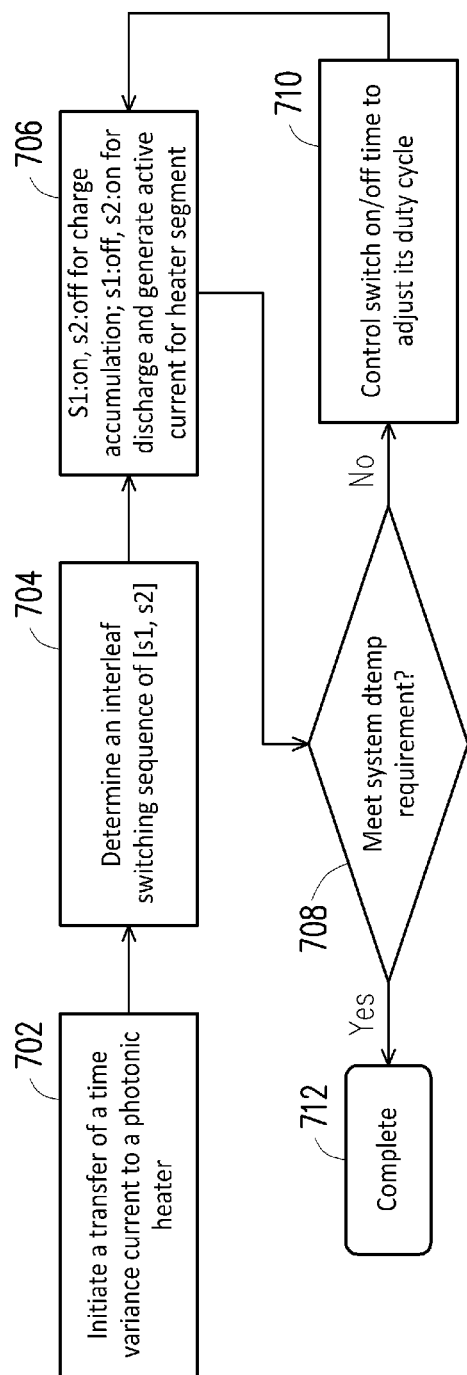
FIG. 7 is a flow diagram illustrating stages of a method for operating a photonic heater in accordance with some embodiments.

FIG. 7 illustrates a flow diagram of a method 700 of controlling the temperature of photonic heater 100. For example, at operation 702 of method 700 a transfer of a time variance current to photonic heater 100 is initiated by operation of first switch S1 220 and second switch S2 222 of transfer circuit 104. For example, current source Idc 102 is connected to heating element 106 via transfer circuit 104. After the initiation of the transfer of the time variance current at operation 702, method 700 proceeds to operation 704 where, an interleaf switching sequence of first switch S1 220 and second switch S2 222 is determined. In some embodiments, in the interleaf switching sequence, first switch S1 220 and second switch S2 222 are not in the switched ON state at the same time.

At operation 706 of method 700, first switch S1 220 is switched ON and second switch S2 222 is switched OFF for charge accumulation. In addition, at operation 706 of method 700, first switch S1 220 is switched OFF and second switch S2 222 is switched ON for discharge and to generate the time variant current for heating element 106.

At decision operation 708 of method 700, it is determined whether the change in temperature requirement (also referred to as dtemp or ΔT) is met by the current switching sequence. If the change in temperature is met by the current switching sequence at decision operation 708, method 700 is completed at operation 712. In example embodiments, the ΔT is determined by continuously comparing a current temperature of heating element 106 and a desired temperature.

However, if the change in temperature is not met by the current switching sequence at decision operation 708, method 700 proceeds to operation 710 where a switch ON/OFF time of first switch S1 220 and/or second switch S2 222 are altered to adjust the duty cycle of first switch S1 220 and/or second switch S2 222. For example, the duty cycle of one or both of first switch S1 220 and second switch S2 222 are adjusted to achieve the desired temperature at heating element 106. After altering the switch ON/OFF time at operation 710, method 700 loops back to operation 706. In example embodiments, operations 706, 708, and 710 are repeated till a desired change in temperature is achieved at heating element 106. In other example embodiments, operations 706, 708, and 710 are repeated till the power consumption of heating element 108 is at a predetermined level.

Figure 8:
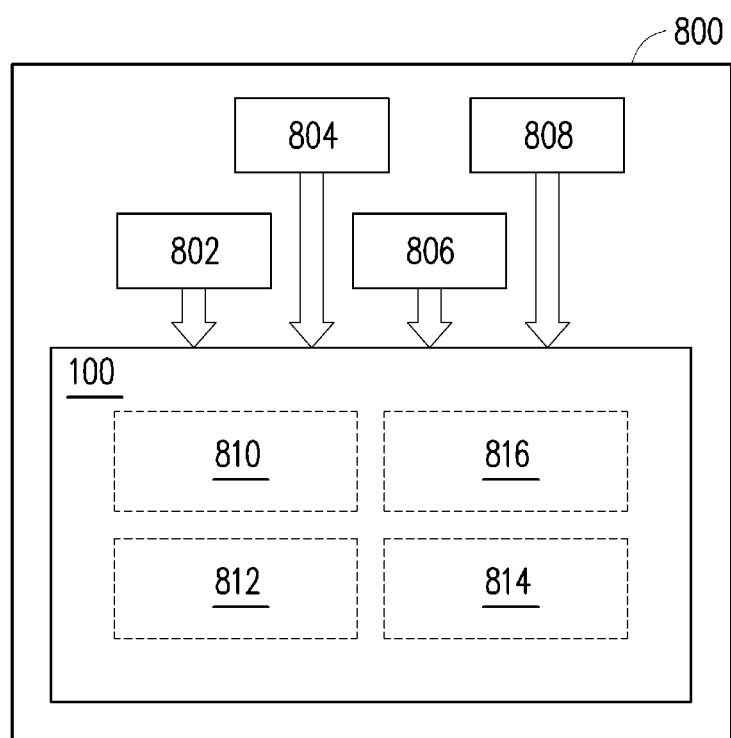
FIG. 8 illustrates an example layout of a photonic heater in accordance with some embodiments.

FIG. 8 illustrates an example layout 800 of photonic heater 100. As shown in FIG. 8, layout 800 includes a current input 802, a switch controller 804, a duty cycle controller 806, a reference ground 808, a first switch segment 810, a second switch segment 812, a capacitor segment 814, and a heater segment 816. First switch segment 810 includes first switch S1 220. Second switch segment 812 includes second switch S2 222. Capacitor segment 814 includes charge storage device C 224. Heater segment 816 includes heating element 106. As illustrated in example layout 800 of FIG. 8, first switch segment 810, second switch segment 812, charge storage device segment 814, and heater segment 816 can be formed on one chip.

Current input 802 includes current source Idc 102. Switch controller 804 is operable to control the switching ON and the switching OFF of first switch S1 220 and second switch S2 222. For example, switch controller 804 is operable to provide a trigger signal to change the state of first switch S1 220 and second switch S2 222. Duty cycle controller 806 is operable to determine and alter the duty cycle of first switch S1 220 and second switch S2 222. For example, photonic heater 100 includes a feedback circuit (not shown) connected to heating element 106. The feedback circuit is operable to provide a temperature of heating element 106 to duty cycle controller 806. Duty cycle controller 806 is then operable to alter a duty cycle of either one or both of first switch S1 220 and second switch S2 222 to alter the current temperature of heating element 106. It will be apparent to a person with ordinary skill in the art that layout 800 is an exemplary in nature, and other layouts for photonic heater 100 are foreseeable. For example, after reading this disclosure, it will be apparent to a person with the ordinary skill in the art that first switch segment 810, second switch segment 812, capacitor segment 814, and heater segment 816 can be formed at different positions.

Figure 9:
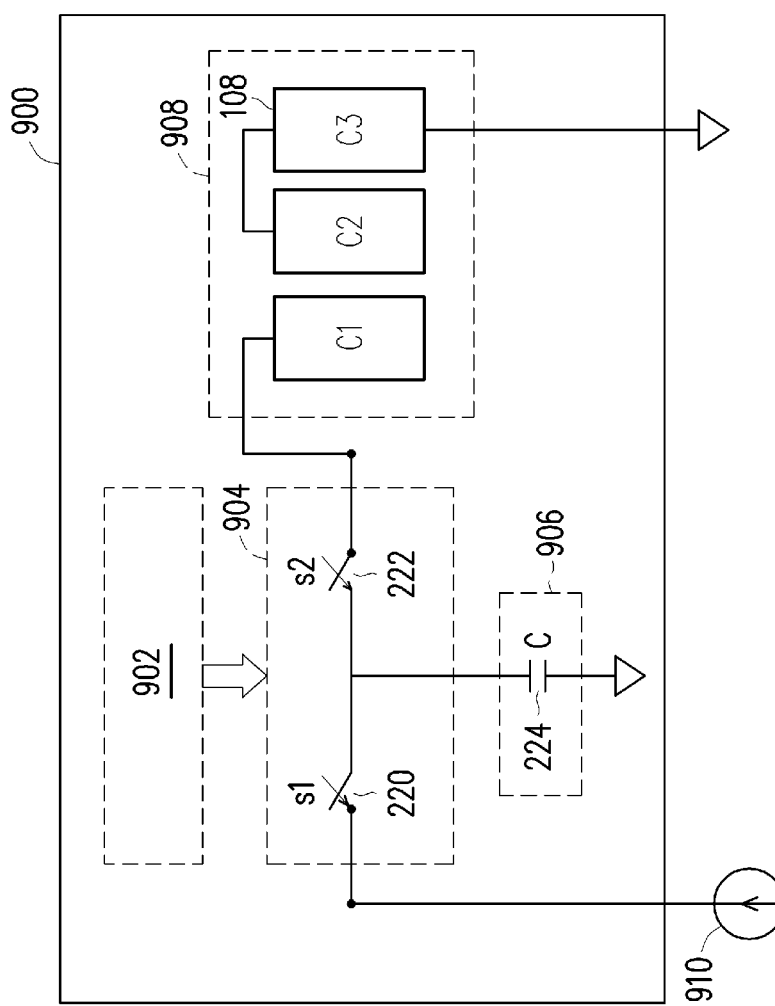
FIG. 9 illustrates another example layout of a photonic heater in accordance with some embodiments.

FIG. 9 illustrates another example layout 900 of photonic heater 100. As illustrated in FIG. 9, layout 900 includes a controller segment 902, a switch segment 904, a capacitor segment 906, and a heater segment 908. Switch segment 904 includes both first switch S1 220 and second switch S2 222.

As illustrated in FIG. 9, a second end of first switch S1 220 is connected to a first end of second switch S2 222.

Capacitor segment 906 includes charge storage device C 224. As shown in FIG. 9, a first end of charge storage device C 224 of capacitor segment 906 is connected to both first switch S1 220 and second switch S2 222 via a common node. A second end of charge storage device C 224 of charge storage device segment 906 is connected to ground. A current source 910 is connected to a first end of first switch S1 220 of switch segment 904.

Controller segment 902 includes a switch ON/OFF controller 804 and a duty cycle controller 806 (not shown). In examples, controller segment 904 includes a single unified controller operable to both switch ON/OFF and control the duty cycle of both first switch S1 220 and second switch S2 222.

Heater segment 908 includes conductors 108. For example, and as shown in FIG. 9, heater segment 908 includes conductors C1, C2, and C3. Although only three conductors C1, C2, and C3 are shown in heater segment 908, after reading this disclosure it will be apparent to a person with skill in the art that heater segment 908 may include a different number of conductors 108.

A first end of heater segment 908 is connected to a second end of switch segment 904 and a second end of heater segment 908 is connected to ground. In example embodiments, and as illustrated in example layout 900 of FIG. 9, controller segment 902, switch segment 904, charge storage device segment 906, and heater segment 908 are be formed on a single chip.

Figure 10:
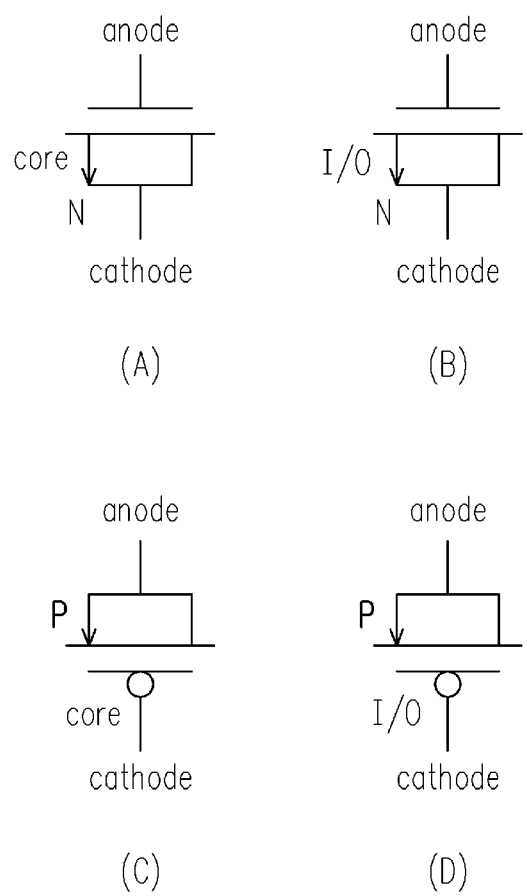
FIG. 10 illustrates examples of a charge storage device of a photonic heater, in accordance with some embodiments.

In example embodiments, charge storage device C 224 is a capacitor. In an embodiment, the capacitor of charge storage device C 224 is implemented three different ways. These three example ways of implementing charge storage device 224 are compliant with complementary metal oxide semiconductor (CMOS) silicon on chip (SoC) process technology. For example, the first example type of charge storage device C 224 includes core devices and I/O devices with N-type doping or P-type doping. Examples of the first type of charge storage device C 224 are shown in FIG. 10.

For example, FIG. 10(A) illustrates charge storage device 224 which includes a core device with N-type doping. In example embodiments, core devices may include thin-oxide transistors with smaller gate lengths (i.e., approximately 90 nm or 0.18 um) and lower supply voltage (i.e., approximately less than 1.2V). As shown in FIG. 10(A), the gate of the core device acts as an anode. For example, the gate of the core device is doped with n+ silicon layer which behaves as a metal layer which forms the anode for charge storage device C 224. The cathode for charge storage device C 224 is formed by connecting the source and the drain together. The anode and the cathode are separated by dielectric material, such as silicon dioxide (SiO2) or other suitable material.

FIG. 10(B) illustrates charge storage device C 224 that includes an I/O device with N-type doping. In example embodiments, I/O devices may include thick-oxide transistors with larger gate lengths (i.e., approximately 0.18 um, 0.25 um, or 0.35 um) and higher supply voltage (i.e., approximately 1.8 V, 2.5 V, or 3.3 V). As shown in FIG. 10(A), the gate of the I/O device forms the anode and the source and the drain connected together form the cathode for charge storage device C 224.

FIGS. 10(C) and 10(D) illustrate charge storage device C 224 which includes the core device and the I/O device with P-type doping respectively. For example, and as illustrated in FIG. 10(C), the gate of the P-type core device forms the cathode of charge storage device C 224 while the source and the drain connected together form the anode. Moreover, and as illustrated in FIG. 10(D), for the P-type I/O device, the gate of the P-type I/O device forms the cathode of charge storage device C 224 and the source and the drain connected together form the anode.

Figure 11:
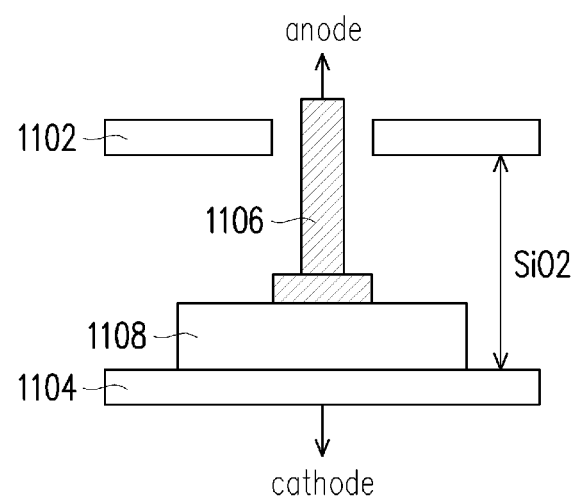
FIG. 11 illustrates examples of charge storage device of a photonic heater in accordance with some embodiments.

A second type of example charge storage device C 224 includes a metal-insulator-metal (MIM) type device. An example of the second type of charge storage device C 224 is illustrated in FIG. 11. As illustrated in FIG. 11, the second type of charge storage device C 224 includes a first metal layer 1102 and a second metal layer 1104 arranged in parallel to first metal layer 1102. The second type of charge storage device C 224 further includes an anode 1106 separated from second metal layer 1104 by a thin insulator 1108. Second metal layer 1104 acts as a cathode for the second type of charge storage device C 224. The space between first metal layer 1102, second metal layer 1104, anode 1106, and thin insulator 1108 is filled with dielectric material, such as silicon dioxide (SiO2) or other suitable material. In example embodiments, first metal layer 1102 is thicker than second metal layer 1104. In other example embodiments, both first metal plate 1202 and second metal plate 1204 are made of copper.

A third type of charge storage device C 224 includes a metal-oxide-metal (MOM) device. Examples of the third type of charge storage device C 224 are illustrated in FIGS. 12A-D. For example, FIG. 12A illustrates a side view of a first example implementation of the third type of charge storage device C 224. As illustrated in FIG. 12A, the third type of charge storage device C 224 includes a first metal plate 1202 arranged on top of a second metal plate 1204. The space between first metal plate 1202 and second metal plate 1204 is filled with dielectric material, such as, silicon dioxide (SiO2) or other suitable material. One of first metal plate 1202 and second metal plate 1204 forms an anode while the other one forms a cathode for the charge storage device.

In an example embodiment, first metal plate 1202 and second metal plate 1204 are of the same metal type. In another example embodiment, first metal plate 1202 is thicker than second metal plate 1204. In other example embodiments, both first metal plate 1202 and second metal plate 1204 are made of copper.

FIG. 12B illustrate a first top view of the third type of charge storage device 224. As shown in FIG. 12B, first metal plate 1202 and second metal plate 1204 may not be uniform metal plates. For example, and as shown in FIG. 12B, first metal plate 1202 and second metal plate 1204 may include metal strips arranged to form first metal plate 1202 and second metal plate 1204. FIG. 12C illustrates a second top view of the third type of charge storage device 224. In the second top view first metal plate 1202 and second metal plate 1204 are rotated by 90° from the first top view of FIG. 12B. As shown in the second top view of FIG. 12C, first metal plate 1202 and second metal plate 1204 may include metal strips arranged to form first metal plate 1202 and second metal plate 1204.

In example embodiments, more than one metal plates can be used to form the anode and the cathode of charge storage device C 224. For example, FIG. 12D illustrates the third type of charge storage device C 224 in which two metal plates are used for each of the cathode and the anode. For example, and as shown in FIG. 12D, the third type of charge storage device C 224 includes metal plates 1202, 1202' as the anode and metal plates 1204, and 1204' as the cathode. In an embodiment, the third type of charge storage device C 224 is formed by placing each of metal plates 1202, 1202', 1204, and 1204' different planes or by placing metal plates 1202 and 1204 in a first plane and metal plates 1202' and 1204' in a second plane. Although only three types of charge storage devices C 224 are discussed in this disclosure, after reading this disclosure it will be apparent to a person with ordinary skill in the art that other types of charge storage devices C 224 can be used in photonic device 100.

Figure 13A:
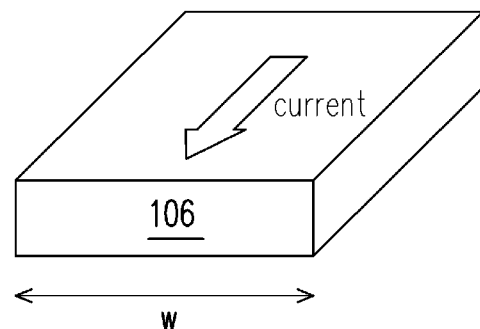
FIG. 13A illustrates an example representation of a heating element of the photonic heater in accordance with some embodiments.

In example embodiments, the disclosed photonic heater 100 is operable to improve reliability of a chip in which it is incorporated. For example, photonic heater 100 has a lower current stress level compared with to a traditional photonic circuit. FIG. 13A illustrates a representation of heating element 106 on a chip. As shown in FIG. 13A, heating element 106 can be represented as a material having width w. A current density through heating element 106 of a width w is determined as:

$$\text{Current Density} = \text{current}/w \quad (5)$$

In embodiments, a current density through a material is an approximate measure of an amount of stress on the material. For example, a lower amount of current provides a lower current density in a material with the same width w. In example embodiments, a root mean square (RMS) value of the second current i2 is less than the RMS value of the current Idc. Hence, the current density on heating element 106 for the second current i2 is lower than that of the current Idc. In example embodiments, the reduced current density provides a lower stress, a higher current limitations, and higher reliability for photonic heater 100.

Figure 13B:
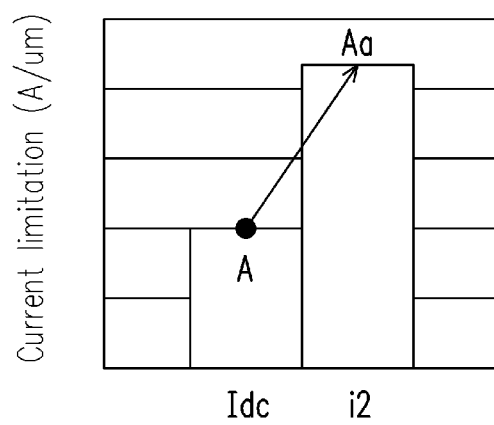
FIG. 13B illustrates a comparison of current limitations of two types of current through the heating element of the photonic heater in accordance with some embodiments.

FIG. 13B illustrates a graphical representation of current limitations for both the current Idc and the second current i2 for photonic heater 100. For example, bar A in FIG. 13B represents the current limitation for the current Idc and bar Aa represents the current limitation for the second current i2 on heating element 106. As shown in FIG. 13B, the current limitation for the second current i2 is higher than that of the current Idc. In example embodiments, the current limitation for the second current i2 is approximately five times compared to the current limitation of the current Idc.

Figure 14A:
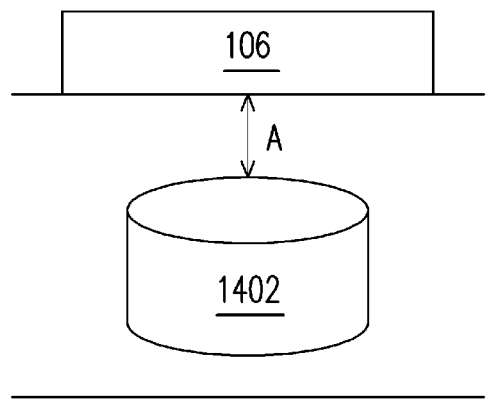
FIG. 14A illustrates a first example design feature for a photonic heater in accordance with some embodiments.

FIG. 14A illustrates first example design features for photonic heater 100. For example, FIG. 14A illustrates a physical implementation and design rule for increasing efficiency of photonic heater 100. As shown in FIG. 14A, a predetermined minimum vertical distance A between heating element 106 and a photonic device 1402 increases efficiency of photonic heater 100. The minimum vertical distance A between heating element 106 and a photonic device 1402 may be within an approximate range of 0.1 micrometer and 1.5 micrometers. In example embodiments, the vertical gap between photonic device 1402 and heating element 106 is filled with a dielectric material, such as silicon dioxide (SiO$_2$) or other suitable material. In example embodiments, the vertical distance A increases efficiency heating as well performance of photonic device 1402. In addition, the vertical distance A reduces EM interference between photonic device 1402 and photonic heater 100. Moreover, the vertical distance A increases fabrication efficiency of photonic heater 100.

Figure 14B:
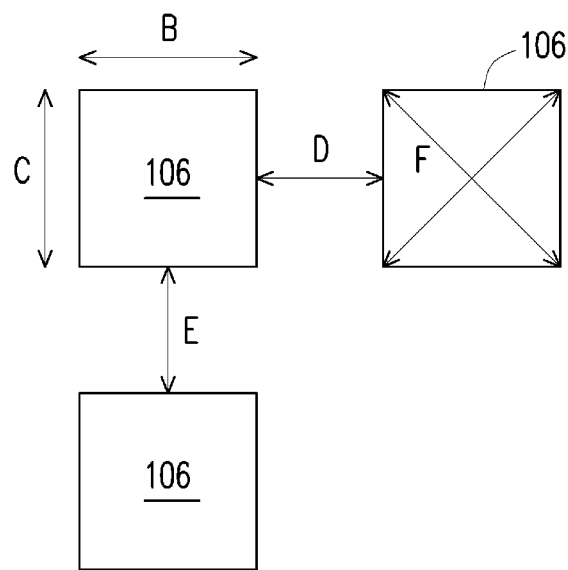
FIG. 14B illustrates a second example design feature for a photonic heater in accordance with some embodiments.

FIG. 14B illustrates second example design features for photonic heater 100. In example embodiments, the second design features are associated with placement of multiple heating elements 106 to increase an overall efficiency of photonic heater 100. For example, and as shown in FIG. 14B, a minimum width B of heating element 106 to be more than approximately 1.0 micro-meter. A minimum length C of heating element 106 to be more than approximately 1.0 micro-meter. Similarly, a minimum vertical space E between two heating elements 106 to be more than approximately 2.5 micrometers. In addition, a minimum horizontal space D between two heating elements 106 to be more than approximately 2.5 micrometers. Moreover, a minimum area F of heating element may be greater than approximately 1.0 micrometer square.

Table 14C lists the design features discussed with reference to FIGS. 14A and 14B. In example embodiments, the design features of FIG. 12B, such as the minimum width B, the minimum length C, the minimum horizontal space D, the minimum vertical space E, and the minimum area F, increase optimal dissipation of heat from heating element 106 into photonic device 106, increases efficiency of fabrication of photonic heater 106, and reduces EM interference between circuit elements of photonic heater 100 and photonic device 1402.

Figure 15A:
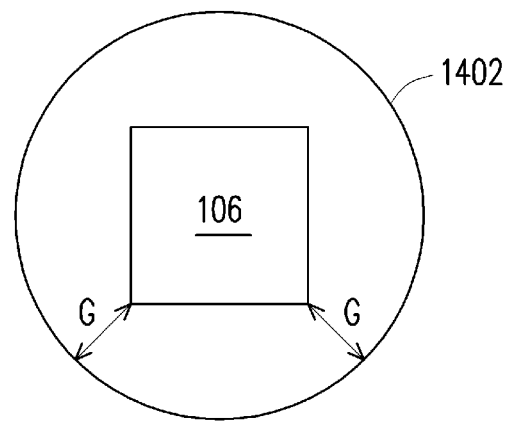
FIG. 15A illustrates third example design feature for a photonic heater in accordance with some embodiments.
Figure 15B:
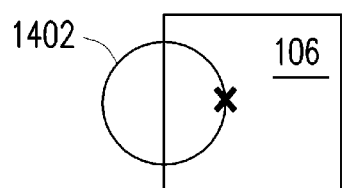
FIG. 15B illustrates fourth example design feature for a photonic heater in accordance with some embodiments.
Figure 15C:
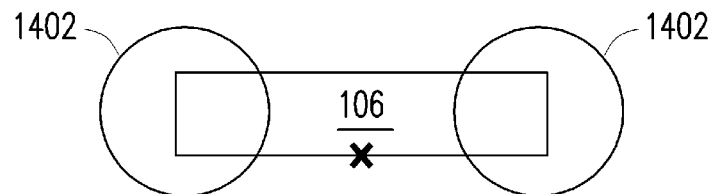
FIG. 15C illustrates fifth example design feature for a photonic heater in accordance with some embodiments.

FIG. 15A, 15B, 15C, and Table 15D illustrate additional example design features for increased efficiency of photonic heater 100. For example, FIG. 15A illustrates a third example of design feature for photonic heater 100. As shown in FIG. 15A, for increased efficiency, dimensions of heating element 106 to be smaller than the dimensions of photonic device 1402. For example, and as shown in FIG. 15A, for increased efficiency, a projection of an outer boundary of heating element 106 should be completely inside the projection of the outer boundary of photonic device 1402. In addition, and as shown in FIG. 15A, for increased efficiency, there should be a minimum distance G of approximately 0.5 micrometers between the closest point on the projection of the outer boundary of photonic device 1402 and the projection of the outer boundary of heating element 106. The minimum distance G increases efficiency of transfer of heat from heating element 106 to photonic device 1402.

In another example, and as illustrated in FIG. 15B, for increased efficiency no part of the projection of the outer boundary of heating element 106 may be outside the outer boundary of the projection of photonic device 1402.

FIG. 15C illustrates another example of design feature for photonic heater 100. In example embodiments, like the other design features discussed with reference to FIGS. 14A, 14B, 15A, and 15B, the example design feature of FIG. 15C increases the efficiency of photonic heater 100. For example, and as shown in FIG. 15C, for increased efficiency, two heating elements 106 may not be placed at two ends of photonic device 1402 and only partially overlapping with the projection of the outer boundaries of photonic device 1402.

Table 15D lists the example design features discussed with reference to FIGS. 15A, 15B, and 15C. In example embodiments, the design features discussed with reference to FIGS. 14A, 14B, 15A, 15B, and 15C provides efficient transfer of heat from heating element 106 to photonic device 1402 and minimizes interference with functioning of circuit elements of photonic device 1402. Moreover, these design features optimizes process of formation of photonic heater 100 on the chip with photonic device 1402.

In example embodiments, photonic heater 100 provides a way to achieve low power consumption for photonic electronic system on chip (SOC) design. Moreover, transfer circuit 104 is operable to provide a time variant current (i.e. second current i2) to heating element 106. In addition, photonic heater 100 provides a duty cycle control mechanism for the switches S1 220 and S2 222 of transfer circuit 104 to tune the overall power consumption. Hence, photonic heater 100 is operable to provide improved temperature control and EM reliability. The improved temperature control is achieved by controlling the amount of the second current i2 being injected to heating element 106 though the duty cycle control mechanism. For example, the temperature of heating element 106 is increased by increasing the duty cycle and is decreased by decreasing the duty cycle of switches S1 220 and S2 222 of transfer circuit 104. Similarly, the EM reliability is improved by adjusting the current stress though the duty cycle of switches S1 220 and S2 222 of transfer circuit 104.

In example embodiments, a photonic heater comprises a current source, a transfer circuit connected to the current source, and a heating element connected to the transfer circuit. The transfer circuit is configured to regulate an amount of current being transferred from the current source to the heating element.

In example embodiments, a photonic heater comprises a current source and a transfer circuit connected to the current source. The transfer circuit is operable to convert a time invariant current of the current source into a time variant current and provide the time variant current to a heating element connected to the transfer circuit. The transfer circuit is further operable to regulate an amount of the time variant current being provided to the heating element In example embodiments, a method of providing localized heating in a photonic circuit is provided. The method comprises determining a duty cycle for the plurality of switches of a transfer circuit, where the transfer circuit is connected between a current source and a heating element. The method then includes determining a switching sequence of the plurality of switches of a transfer circuit based on the determined duty cycle and initiating the switching sequence.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic heater comprising:
   a current source;
   a transfer circuit connected to the current source, wherein the transfer circuit comprises a first switch, a second switch, and a charge storage device, wherein the first switch is connected in series with the current source, wherein the second switch is connected in series with a heating element, and wherein the charge storage device is connected at a common node of the first switch and the second switch; and
   a photonic heater comprising the heating element connected to the transfer circuit, wherein the transfer circuit is operable to regulate an amount of current being transferred from the current source to the heating element, wherein the transfer circuit being operative to regulate the amount of current being transferred from the current source to the heating element comprises the first switch and the second switch of the transfer circuit being configured to operate in an interleaf switching sequence, and wherein in the interleaf switching sequence, the first switch and the second switch are not switched on at a same time.

2. The photonic heater of claim 1, wherein the current source is a direct current (DC) source.

3. The photonic heater of claim 1, further comprising a feedback circuit connected to the heating element and a duty cycle control circuit connected to the transfer circuit, wherein the feedback circuit is operable to provide a temperature of the heating element as a feedback to the duty cycle control circuit.

4. The photonic heater of claim 3, wherein the duty cycle control circuit is operable to alter a duty cycle of the first switch or the second switch to regulate the amount of current based on the temperature.

5. The photonic heater of claim 1, further comprising a switch control circuit connected to the transfer circuit, wherein the switch control circuit is operable to switch on and switch off the first switch and the second switch.

6. The photonic heater of claim 1, wherein the charge storage device is at least one of the following: a thin oxide transistor, a thick oxide transistor, a metal insulation metal (MIM) device, and a metal on metal (MOM) device.

7. A photonic heater comprising:
a current source;
a heating element; and
a transfer circuit connected to the current source and the heating element, wherein the transfer circuit comprises a first switch, a second switch, and a charge storage device, wherein the first switch is connected in series with the current source, wherein the second switch is connected in series with the heating element, wherein a first end of the charge storage device is connected between a common node of the first switch and the second switch and a second end of the charge storage device is connected to the ground, wherein the transfer circuit is operable to convert a time invariant current of the current source into a time variant current and provide the time variant current to the heating element connected to the transfer circuit, wherein the transfer circuit is operable to regulate an amount of the time variant current being provided to the heating element, wherein the transfer circuit being operative to regulate the amount of the time variant current being provided to the heating element comprises the first switch and the second switch of the transfer circuit being configured to operate in an interleaf switching sequence, and wherein in the interleaf switching sequence, the first switch and the second switch are not switched on at a same time.

8. The photonic heater of claim 7, further comprising a duty cycle controller operable to control a duty cycle of at least one of the following: the first switch and the second switch.

9. The photonic heater of claim 8, further comprising a feedback circuit operable to provide a temperature of the heating element to the duty cycle controller.

10. The photonic heater of claim 8, wherein the heating element and a photonic device are separated by a first predetermined distance.

11. The photonic heater of claim 7, wherein the heating element comprises at least two metal conductors, wherein the at least two metal conductors are separated by at least a second predetermined distance.

12. A method of providing heating of a photonic circuit, the method comprising:
determining a duty cycle for a transfer circuit, wherein the transfer circuit is connected between a current source and a heating element of a photonic heating device, wherein the transfer circuit comprises a first switch, a second switch, and a charge storage device, wherein the first switch is connected in series with the current source and the second switch is connected in series with the heating element, wherein a first end of the charge storage device is connected between a common node of the first switch and the second switch and a second end of the charge storage device is connected to the ground, and wherein the transfer circuit is operable to transfer a time invariant current from the current source to the heating element;
determining a switching sequence of the first switch and the second switch of a transfer circuit based on the determined duty cycle, wherein the switching sequence comprises an interleaf switching sequence, and wherein in the interleaf switching sequence, the first switch and the second switch are not switched on at a same time; and
initiating the switching sequence.

13. The method of claim 12, further comprising:
receiving a feedback comprising a temperature of the photonic heating device; and
adjusting the duty cycle of at least one of the first switch and the second switch of the transfer circuit to adjust the temperature of the photonic heating device.

14. The method of claim 13, wherein adjusting the duty cycle of the at least one of the first switch and the second switch comprises adjusting a switch on time for the at least one of the first switch and the second switch.

15. The method of claim 14, further comprising heating the photonic circuit using the heating element, wherein the heating element and the photonic circuit are separated by a first predetermined distance.

16. The method of claim 14, wherein the heating element comprises at least two metal conductors, and wherein the at least two metal conductors are separated by a second predetermined distance.

17. The method of claim 12, wherein the charge storage device comprises a transistor device.

18. The method of claim 12, wherein the charge storage device comprises a first metal plate and a second metal plate separated from the first metal plate.

19. The method of claim 13, wherein adjusting the duty cycle comprises adjusting the duty cycle through a duty cycle controller operable to control the duty cycle of the first switch and the second switch.

20. The method of claim 13, wherein receiving the feedback comprising the temperature of the photonic circuit comprises receiving the feedback from a feedback circuit operable to provide the temperature of the heating element to the duty cycle controller.

* * * * *